Sept. 13, 1960 — G. A. LYON — 2,952,491
WHEEL COVER
Filed Feb. 17, 1956
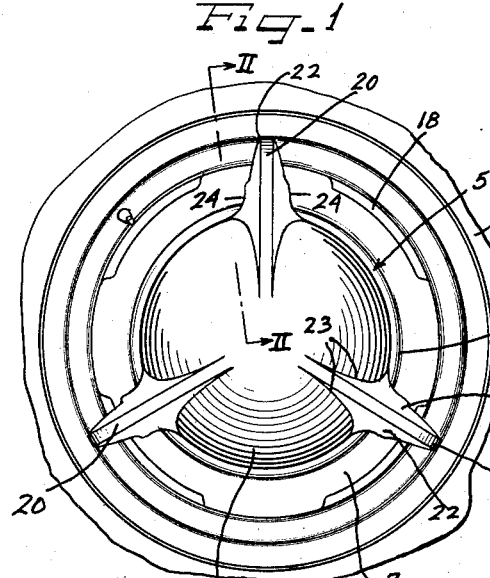
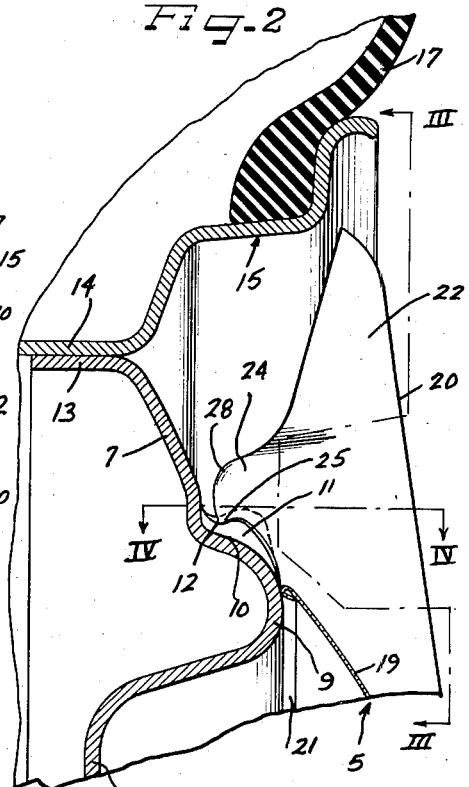
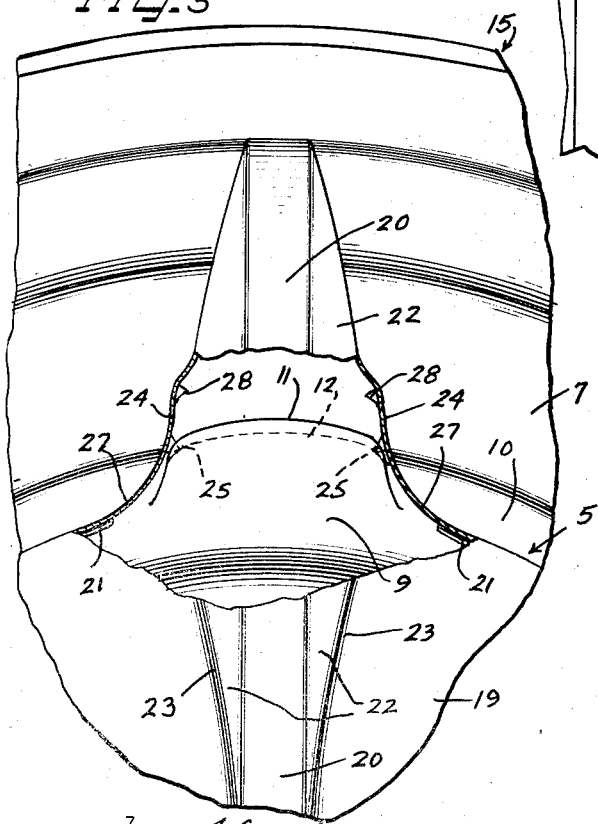
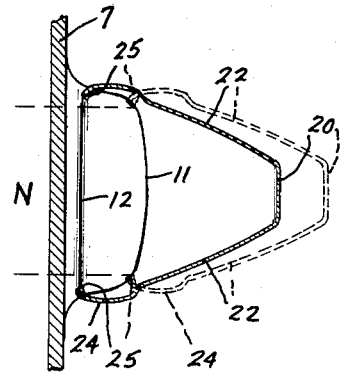
Inventor
GEORGE ALBERT LYON

United States Patent Office 2,952,491
Patented Sept. 13, 1960

2,952,491

WHEEL COVER

George Albert Lyon, 13881 W. Chicago Blvd.,
Detroit 28, Mich.

Filed Feb. 17, 1956, Ser. No. 566,231

8 Claims. (Cl. 301—37)

The present invention relates to the ornamental and protective covering of the outer sides of vehicle wheels and more especially automobile wheels.

In U.S. Re. 24,105, dated January 3, 1956, is disclosed a commercially quite advantageous and now widely used arrangement for retaining a hub cap on a wheel by means of bumps pressed out of a generally radially outwardly facing annular shoulder of a disk spider vehicle wheel body. The hub cap in such arrangement has a resilient beaded edge structure that engages in snap-on, pry-off relation with the bumps. By virtue of the continuous bead, the entire margin of the hub cap cooperates resiliently in the clover leafing tendency of the margin due to the stretching of the bead at the points of engagement with the retaining bumps to effect tensioned engagement of the bead with the bumps. There is also a coaction of the bead with the wheel body shoulder intermediate the bumps that enhances this resilient grip of the bead with the bumps.

Where it is desired to add ornamentation to the hub cap such as so called "knock-off" ears, such ears must be separately formed and attached if the circular continuity of the hub cap margin and thus the retaining bead is to be preserved. However, this is an expensive expedient.

It is, of course, much less expensive to provide the ornamental projections or ears in one piece with the body of the hub cap. That is, from an economy standpoint it is desirable to provide the entire unit as a stamping from a single metal blank. It is to the attainment of this objective while yet taking advantage of the retaining means on the wheel body in the form of retaining bumps to retain the hub cap on the wheel to which the present invention is directed.

It is accordingly an important object of the present invention to provide a novel wheel structure having a wheel body equipped with cover retaining bump means and with a hub cap of novel structure in which the circularity of the hub cap margin is interrupted at predetermined spaced intervals by radially outwardly projecting configurations but is equipped with improved retaining means effectively engageable with the retaining bumps in snap-on, pry-off relation.

Another object of the invention is to provide a hub cap for disposition at the outer side of a vehicle wheel having retaining projections and wherein the hub cap is provided with novel retaining means engageable under resilient tensioned snap-on, pry-off relation with the retaining projections.

A further object of the invention is to provide novel wheel cover structure with improved means for snap-on, pry-off retaining interengagement with a vehicle wheel with which the cover is adapted to be assembled.

It is still another object of the invention to provide improved retaining means for vehicle wheel covers.

Other objects, features and advantages of the present invention will be readily apparent from the following detailed description of a preferred embodiment thereof taken in conjunction with the accompanying drawing, in which:

Figure 1 is an outer side elevational view of a wheel structure embodying features of the invention;

Figure 2 is an enlarged fragmentary radial sectional elevational detail view taken substantially on the line II—II of Figure 1;

Figure 3 is a fragmentary sectional elevational detail view taken substantially on the line III—III of Figure 2; and Figure 4 is a fragmentary, more or less schematic, sectional detail view taken substantially in the plane of line IV—IV of Figure 2.

In the exemplary form of the invention illustrated a wheel trim or cover member of the hub cap type 5 is constructed and arranged for disposition at the outer side of a vehicle wheel including a disk spider wheel body 7. Centrally the wheel body is dished to provide a bolt-on flange 8 arranged to be attached to an appropriate portion of the axle structure of the vehicle. Intermediately about the bolt-on flange 8 the wheel body is provided with a generally axially outwardly projecting annular nose bulge 9 having at the radially outer side thereof a generally radially outwardly facing annular shoulder 10 that is provided at suitable spaced intervals such as three with generally radially outwardly projecting cover retaining projections or bumps 11. These bumps project to a substantial diameter beyond the shoulder 10 and are provided with undercut shoulders 12.

Radially outwardly beyond the wheel body shoulder 10 the wheel body extends to a generally axially inwardly extending marginal attachment flange 13 secured in suitable manner to a base flange 14 of a multi-flange, drop center tire rim 15 constructed to receive a pneumatic tire 17. At suitable intervals such as four, the wheel body flange 13 may be inset at juncture with the tire rim base flange 14 to provide chain slots or air openings 18.

According to the present invention, the wheel cover member 5, or hub cap, has an essentially circular body 19 provided with a plurality of generally radial ornamental projections 20 which are circumferentially spaced symmetrically and afford arms or ears or spoke-like members for overlying the wheel radially outwardly beyond the normal diameter of the hub cap. Both the hub cap body 19 and the projections 20 are constructed from a single sheet metal blank stamped or drawn to form in suitable die press equipment. The material from which the hub cap 5 is made, may comprise suitable grade of stainless steel, brass, aluminum or the like, with desirably work hardenable resiliency characteristics.

In its normal or circular diameter, the hub cap body 19, which preferably provides a substantially convex or domed shell, is of a size to overlie and protectively close the dished bolt-on flange 8, and more particularly to overlie marginally the nose bulge 9 of the wheel body (Figs. 2 and 3). Those portions of the hub cap body margin between the projections 20 are preferably provided with respective under-turned, bead-like extremity flanges which finish and reinforce the edges of the segmental marginal portions and afford seating means 21 engageable upon the ridge of the nose bulge 9.

In the present instance, the projections 20 are configurated to extend from merger at their radially inner ends with the crown of the hub cap body 19 radially outwardly to a common circle for substantially overlying the tire rim and the wheel body portion intermediate the tire rim and the circular peripheral portions of the hub cap. In one sense, the arrangement is such that the projections 20 appear like spokes emanating from the hub cap and meeting, if not joining the tire rim.

As will be best seen in Figs. 2 and 4, each of the projections 20 has axially inwardly divergent and axially outwardly convergent symmetrical opposite side walls 22 that emanate from or merge with the hub cap body 19 throughout the extent of the projections 20 from the crown of the hub cap body to the circular peripheral margins of the hub cap body along generally flaring or radially outwardly diverging junctures 23 (Figs. 1 and 3).

For enabling attachment of the hub cap 5 to the wheel through the medium of the retaining bumps 11, although the principal diameter of the hub cap may be, as shown, substantially less than the diameter to which the retaining bumps 11 extend, and as in the present instance of a diameter which is actually less than the diameter on which the bumps 11 begin to emanate from the nose bulge shoulder 10, the side walls 22 of the projections 20 are provided with generally axially inwardly directed cover retaining means in the form of side wall retaining finger extensions 24 which are spaced apart in generally opposing relation to a width enabling reception between each pair of the extensions 24 of one of the retaining bumps 11. That is, the side wall or wing cover or hub cap retaining extensions 24 are so related that they will, in assembly of the hub cap with the wheel engage one of the retaining bumps 11 therebetween by opposing the circumferentially facing sides of the respective bump. As best seen in Figure 2, the retaining extensions 24 project axially inwardly substantially beyond the inner extremity of the seating structure 21 of the hub cap body, and, further, have the radially inner edges thereof shaped to clear the wheel body shoulder 10 in the centered position of the hub cap on the wheel.

At their axially inner terminus, the radially inner portions of the respective retaining finger extensions 24 are provided with turned gripping extremity pincer-like bump-gripping jaws 25 providing retaining shoulder structure facing generally axially outwardly and radially in opposition to the shoulders 12 of the bumps 11 (Figs. 2, 3 and 4). These jaws are constructed and related to the retaining bumps 11 to grip each bump between a pair of the jaws 25, with the portions of the jaws that project toward one another in underturned relation behind each of the projections 20 interlockingly interhooked into the adjacent end portion of the undercut 12 of the bump behind the generally axially inwardly and radially outwardly facing shoulder defining the axially outer side of the undercut, as best seen in Figure 4.

By preference, the normal spacing between the finger-jaw extensions 24 of each of the projections 20 is normally slightly less than the width of the bumps 11. This normal or untensioned condition is visualized in dash outline in Figure 4 wherein it will be noted that the normal spacing between the jaws 25 between the parallel dash lines N is substantially less than the spacing between the jaws after the bump 11 has been engaged therebetween, as depicted in full line in Figure 4. This spread or tensioned relationship is attained by moving the fingers 24 and the jaws 25 to the bump gripping relation as by camming the jaws 25 along the generally tapering rounded sides of the bump 11 toward the base or root of the groove defining the undercut 12, thereby gradually spreading the jaws 25 until they snap behind the bump shoulder wherein the jaws are still held in a spread, pinching relation to a greater spacing than the normal spacing.

Resiliency of the retaining fingers 24 and the jaws 25 for enhancing their bump gripping engagement is promoted by the substantial length and flaring structure of the side walls 22 of the horn projections 20 and the merger of the fingers 24 on smooth concave or reentrant junctures 27 (Fig. 3) with the adjacent marginal portions of the hub cap body 19. Through this arrangement, the side walls 22 and the adjacent portions of the hub cap body coact resiliently under the spreading of the retaining jaws 25 incident to gripping the retaining bump 11 to effect a strong resilient tension for pincer-like gripping action of the jaws. On the other hand, since the jaws 25 are obliquely angled relative to the undercut bump shoulder generally convergently toward one another, on the application of pry-off force to the reinforced marginal edge structure 21 intermediate a pair of the horn projections 20, and preferably fairly closely adjacent to one of the jaws 25, the jaw or jaws near the pry-off force can readily be cammingly dislodged from the gripping interlocked relation with the bump.

However, should an axially outward force or pull be applied directly to any one of the horn projections 20 such as by means of a chamois or rag in cleaning or wiping the wheel, the leverage forces generated on the cantilever radially outer portions of the projections, and fulcruming about the gripping jaws, will tend to react, at least to a substantial extent, in increased gripping tension by drawing of the jaws toward one another as a result of the depressing and thus compressing action of the radially inner portions of the projections on the resilient radially inner side walls thereof and contiguous cover body portions. Hence, the retaining jaws 25 maintain their grip quite effectively until released by a pry-off tool properly applied, as described.

Where, as shown, the retaining jaw finger extensions 24 project axially inwardly even beyond the radially outermost portions of the projection side walls 22, additional reinforcement for the retaining jaw extensions 24 may be provided by anglingly turning of the radially outer portions of the extremities thereof generally toward one another under or behind the projections 20 as at 28. This also affords a more finished radially outer corner on the retaining finger extremities.

Whereas the hub cap 5 may be applied to the outer side of the wheel by generally centering it relative to the wheel and aligning the cooperating pairs of jaw fingers 24 with the respective bumps in the manner depicted in dash outline in Figure 4 and then applying uniform axially inward pressure to snap the retaining finger jaws into retaining engagement with the bumps, another mode of application may be to register the retaining jaws 25 of one or more of the radial projections 20 grippingly with respective ones of the retaining bumps 11 by a generally axially inward and then radially inward movement, and then snapping of the remaining one or more of the pairs of jaws 25 into retaining engagement with the remaining retaining bump or bumps by axially inward pressure against the hub cap in the vicinity of the latter jaws. It will be understood that whatever the mode of actually moving the hub cap into the mounted relation to the wheel, once the jaws 25 of all the retaining finger extensions 24 have attained the gripping engagement with the retaining bumps, the hub cap will be held not only properly centered with relation to the wheel, but also tightly drawn axially inwardly against the nose bulge 9 of the wheel body. More particularly, the reinforced edge structures 21 are drawn tightly against the nose bulge, as shown in Figure 2, by virtue of the camming interengagement of the cammingly oblique jaws 25 with the engaged end portions of the bump shoulders.

It will be understood that modifications and variations may be effected without departing from the scope of the novel concepts of the present invention.

I claim as my invention:

1. In a wheel structure including a wheel body having an annular axially outwardly projecting nose bulge provided with a plurality of generally radially outwardly projecting retaining bumps with undercut shoulders that face generally radially outwardly and axially inwardly, a stamped sheet metal cover member for disposition at the outer side of the wheel including a portion for seating against the nose bulge and having thereon stamped projections which overlie the retaining bumps and provide pincers-like jaws retaingly engageable with the retaining pumps and provided with interlock portions projecting generally toward one another and resiliently flexibly interlockingly engageable with said shoulders in snap-on, pry-off relation.

2. In a wheel structure including a wheel body having an annular axially outwardly projecting nose bulge provided with a plurality of generally radially outwardly projecting retaining bumps with undercut shoulders that face generally radially outwardly and axially inwardly, a cover member for disposition at the outer side of the wheel including a portion for seating against the nose bulge and having thereon pincers-like jaws retainingly engageable with the retaining bumps and provided with interlock portions projecting generally toward one another and resiliently flexibly interlockingly engageable with said shoulders in snap-on, pry-off relation, said cover member comprising a hub cap with its principal marginal perimeter seating on the nose bulge and with generally radial projections from said perimeter having thereon said jaws.

3. In a wheel structure including a wheel body having an annular nose bulge provided at the radially outer side thereof with generally radially outwardly projecting retaining bumps with undercut cover retaining shoulders, a hub cap for disposition at the outer side of the wheel including a general marginal perimeter for seating on the nose bulge radially inwardly from the bumps, and provided at intervals corresponding to the bumps with integral radially outwardly projecting arms integrally in one piece with the hub cap and provided with generally axially inwardly extending opposed jaw elements retainingly grippingly engageable with the retaining bumps and having generally underturned interlock elements grippingly engageable under the bump shoulders for resiliently retaining the cover on the wheel and with said perimeter drawn against the nose bulge, said projections and the adjacent marginal portions of the hub cap being resiliently integrated with the jaws for enhancing the resilient grip of the jaws on the bumps.

4. In a wheel cover of the hub cap type for disposition at the outer side of a vehicle wheel, a generally circular cover body having integrally in one piece therewith radial arm projections with retaining fingers extending behind the projections and retainingly engageable with complementary retaining structure on a wheel, said retaining fingers extending axially inwardly beyond the general marginal perimeter of the cover and beyond the general edges of said projections and having interlock elements projecting in underturned relation therefrom, said fingers having portions thereof turned into reinforcing relation to the remainder of the respective fingers and spaced from said underturned elements for enhancing the resilience of the fingers.

5. In a wheel structure including a wheel part having an annular circumferentially spaced series of projections thereon each having a generally radially facing portion with an undercut-like generally axially inwardly and radially facing shoulder, a generally circular stamped hollow sheet metal shell for overlying the wheel and having formed integrally thereon a circumferentially spaced series of generally radially outwardly extending spoke-like hollow arms for concealingly overlying said projections, each of said arms having generally axially inwardly directed side portions provided with cover retaining shoulder structure thereon facing generally axially outwardly and radially in opposition to the projection shoulders and engageable in resiliently tensionable press-on, pry-off relation with said projection shoulders for retaining the cover member on the wheel.

6. In a wheel structure as defined in claim 5, the cover member shoulder structure being provided on generally axially inward projections on the spoke arm sides providing generally circumferentially resiliently deflectable fingers.

7. A wheel structure as defined in claim 6 wherein said fingers have portions thereof spaced from the projection shoulder engaging portions turned into reinforcing, resiliency enhancing relation to the remainder of the finger projections.

8. In a wheel structure including a tire rim and a wheel body supporting the tire rim and having a nose bulge with a generally radially outwardly facing generally annular surface having thereon generally radially outwardly projecting retaining bumps with generally radially outwardly facing nose portions having generally undercut radially outwardly and axially inwardly facing respective shoulders thereon, a hub cap type circular cover shell of sheet metal dimensioned to overlie the wheel body and having a perimeter engageable upon the nose bulge, said perimeter being interrupted at circumferential points corresponding to the disposition of the retaining bumps by radially outwardly projecting spoke arms of integral hollow structure with side walls merging into segments of the hub cap between the arms and resiliently integrated with such segments, said side walls having thereon shoulder structure directed generally radially inwardly in complementary relation to said retaining bump shoulders and engageable in resiliently tensioned press-on, pry-off relation with and behind the retaining bump shoulders for retaining the hub cap on the wheel.

References Cited in the file of this patent

UNITED STATES PATENTS

| | | |
|---|---|---|
| Re. 18,692 | Clark | Dec. 20, 1932 |
| 1,987,223 | Zerk | Jan. 8, 1935 |
| 2,115,183 | Sinclair | Apr. 26, 1938 |
| 2,372,969 | Michals | Apr. 3, 1945 |
| 2,625,439 | Horn | Jan. 13, 1953 |
| 2,675,271 | Lyon | Apr. 13, 1954 |